Nov. 3, 1953     C. ARKIN     2,657,993
MANUFACTURE OF CHEESE
Filed June 21, 1950     3 Sheets-Sheet 1
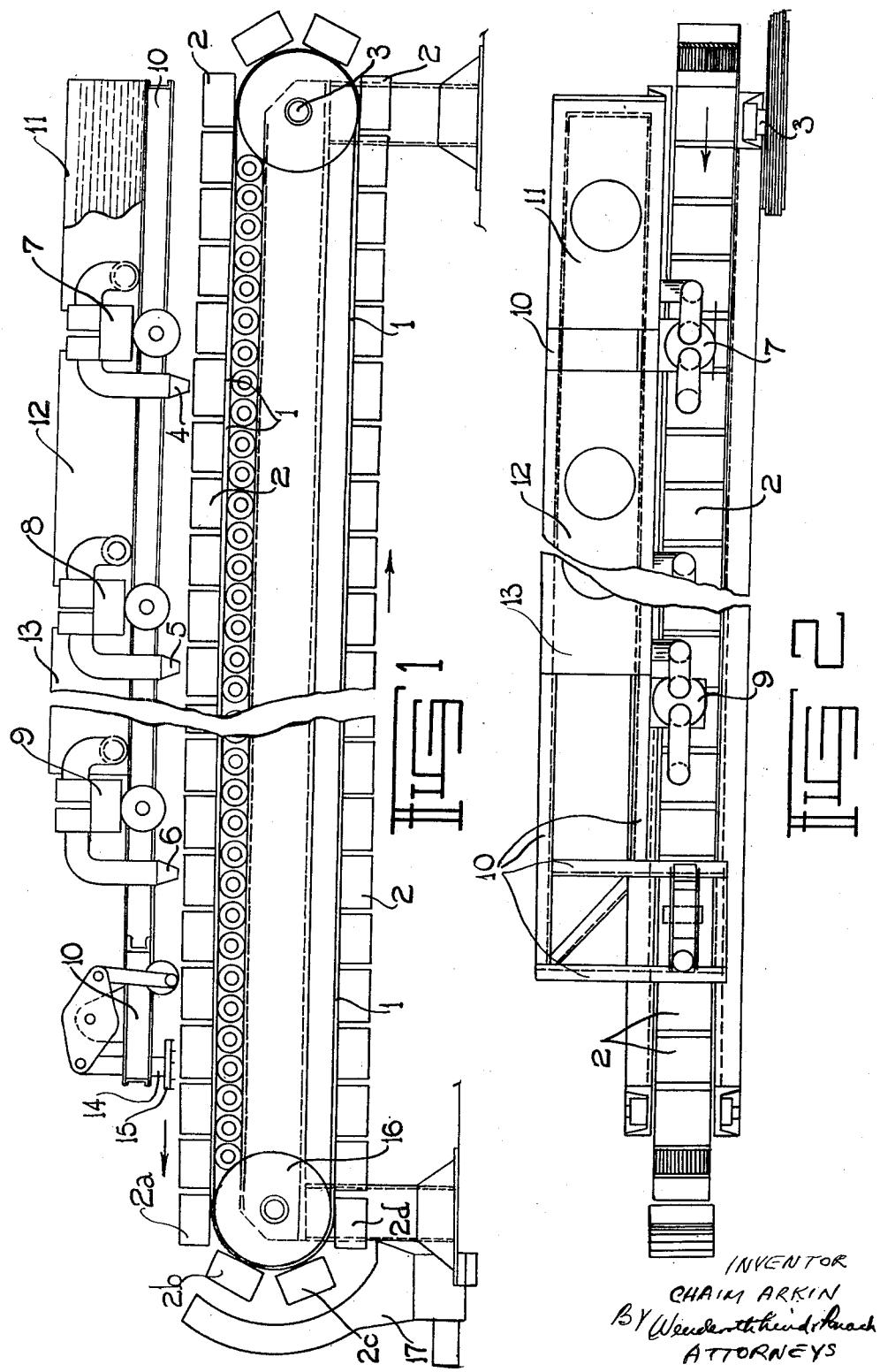

Nov. 3, 1953

C. ARKIN 2,657,993

MANUFACTURE OF CHEESE

Filed June 21, 1950

INVENTOR
CHAIM ARKIN
BY
Wenderoth, Lind & Ponack
ATTORNEYS

Nov. 3, 1953    C. ARKIN    2,657,993
MANUFACTURE OF CHEESE
Filed June 21, 1950    3 Sheets-Sheet 3
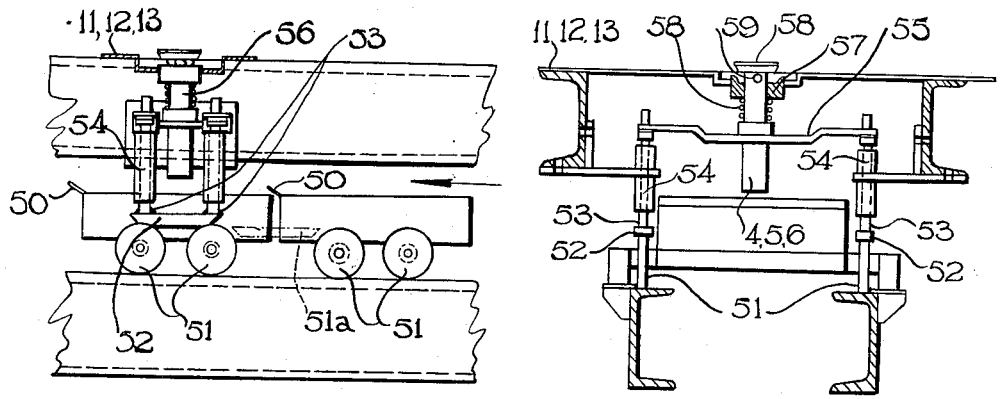
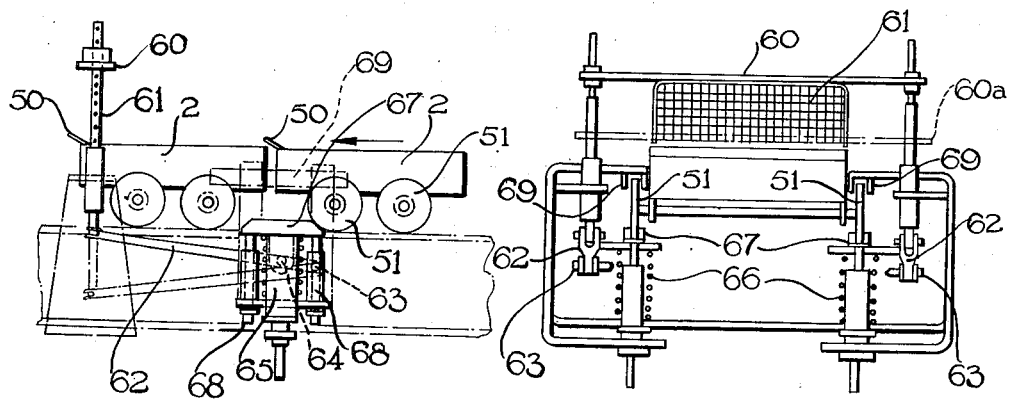
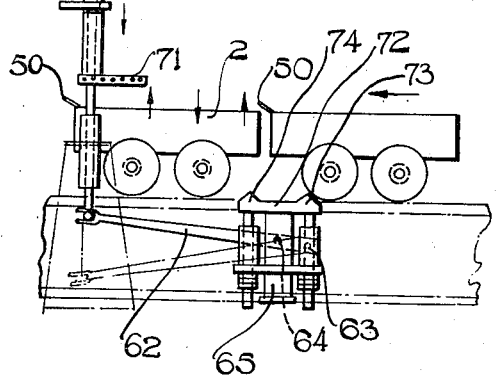
INVENTOR
CHAIM ARKIN
BY Wenderoth Lind & Ponack
ATTORNEYS Patented Nov. 3, 1953

2,657,993

UNITED STATES PATENT OFFICE 2,657,993

MANUFACTURE OF CHEESE

Chaim Arkin, Cape Town, Cape of Good Hope Province, Union of South Africa

Application June 21, 1950, Serial No. 169,483

Claims priority, application Union of South Africa June 24, 1949

12 Claims. (Cl. 99—116)

This invention relates to the manufacture of cheese and particularly to a method of and means for carrying out the various operations involved in such a manufacture in a way improved over the known practice, from the point of view of regularity of composition and quality, rate of output and regulation thereof according to particular requirements, reduction of labour costs by a mechanisation generally of the methods or processes and particularly to a degree calling for a minimum of skilled attention, and continuity and flexibility of operation.

According to the invention improvements as above outlined, and others which will become apparent later in this specification, are achieved by a continuous method embracing the various steps which may be broadly known per se from bringing the milk into effective association with the so-called "starter" and "coagulant" such as rennet, through separation of the whey from the curd, to the dry or semi-dry product in the form of masses ready for curing.

More particularly the invention provides for a progression of the materials starting from measured quantities of the milk through stages essentially as follows:

(a) Inoculation of the milk with a measured proportion of starter;

(b) Incorporation of a measured proportion of coagulant;

(c) Subdivision of the coagulated mass for partial release of the whey;

(d) Drainage of the released whey;

(e) Forceable expression of further whey from the solids;

(f) Partial drying of the solids into a cooked condition;

(g) Beating of the mass into uniform workable consistency;

(h) Compacting of quantities of the mass into forms or bodies suitable for maturing.

Stages a, b, c and to some extent d are conducted in a succession of vessels executing a cyclic movement past supply and measuring means for introduction of the milk and other materials and also past cutter means enterable into the vessels one after the other; the manner of feeding the vessels being such as itself provides adequate intermixing of the contents and additions, and the rate of advance being so controlled as to provide adequate time intervals between the various stages.

Stage d is continued with successive discharge of the subdivided coagulated mass from the vessels aforesaid into a filtering stage, leading the drained products into a centrifugally assisted filtering stage, the Stage e above, which the products undergo whilst continuing to advance at a controlled rate, and which stage combines also the f stage promoted by heat application, from which the more or less dried and cooked mass is subjected to the beater action Stage g. From this last stage the uniform macerated mass suitable for formation into cheeses for maturing, may pass immediately, in predetermined quantities gated off from the general flow of the mass, to Stage h wherein to be compacted or compressed into moulds of suitable form and capacity brought in succession into position to receive the measured quantities.

The entire sequence of operations as above outlined may be conducted mechanically by means of power driven apparatus which is also embraced in the present invention, and an example of the convenient construction of which is illustrated in the accompanying drawings.

In these drawings:

Figure 1 is a side elevation of the apparatus in semi-diagrammatic form;

Figure 2 is a plan;

Figures 5 and 6 are respectively a fragmental side elevation and a cross section of the upper run of conveyor with associated feeds and feed mechanisms, the devices shown being preferred forms of those only diagrammatically shown in Figures 1 and 2;

Figures 7 and 8 are respectively a fragmental side elevation and a cross section of the upper run of conveyor with associated mechanisms for longitudinally cutting material whilst being progressed by the conveyor;

Figure 9 is a fragmental side elevation of the conveyor with associated mechanisms for vertically cutting material being progressed by the conveyor; the mechanisms shown in Figures 7, 8 and 9 being preferred forms of the mechanism indicated only diagrammatically in Figures 1 and 2.

Figure 3:
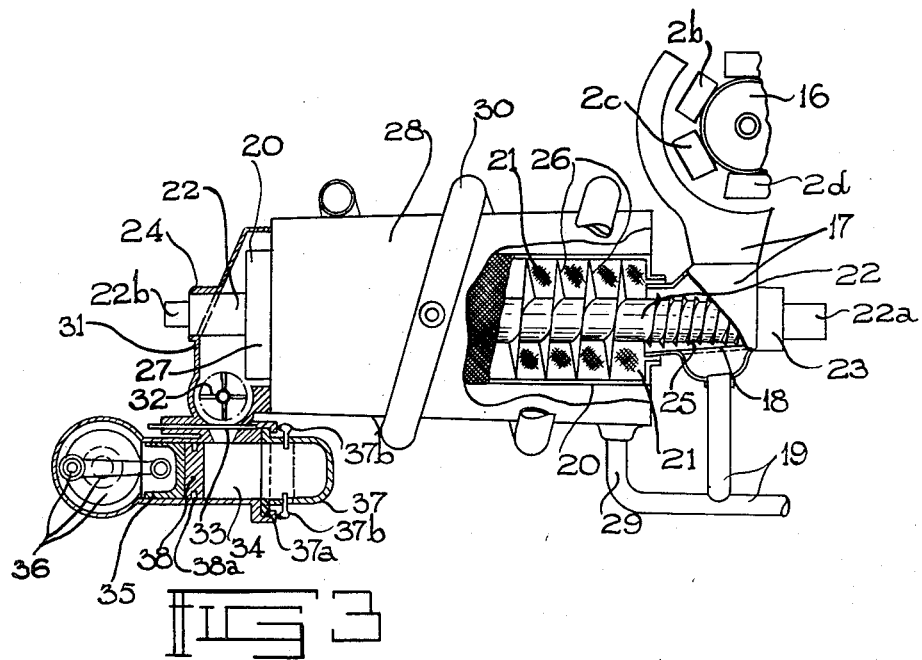
Figure 3 is a continuation (to a slightly smaller scale) of the left hand end of the elevation shown in Figure 1.

Referring to the drawings, and in the first place to Figures 1 to 3, the apparatus consists essentially of an endless flexible conveyor 1 presenting externally attached rectangular trays, cans or other vessels 2 of a standard shape and capacity, in turn as the conveyor advances in the direction of the arrows under any electrical or other source of motive power applied through shaft 3, for receiving the milk, the starter and the coagulant from the spouts as 4, 5 and 6 of the measuring and feeding devices 7, 8 and 9 respectively, suspended over the flat upper run of the conveyor from supply reservoirs as 11, 12 and 13 arranged at fixed or adjustable positions generally along the conveyor system conveniently on a suitable girder or like supporting framework 10.

Operative upon the contents of the respective vessels 2 advancing beyond the coagulant feed 9 a mechanical cutter device as very diagrammatically shown by 14 is carried over the path of the said vessels, conveniently on the reservoir-carrying framework 10, which device consists essentially of a plate or plunger 15 of the same general outline as the vessels, but a free fit therein, enterable downwardly into each vessel in turn with cutter blades or the like underneath it devised to dissect the coagulated mass in the vessel into more or less cube-like portions of any convenient size, and thereafter retiring upwardly, if necessary with a cam controlled action, clear of the vessel advancing meanwhile.

As each vessel then tips through positions indicated by 2a, 2b, 2c and 2d, over the return drum 16 or the like of the conveyor into the return or lower run thereof, its wet contents are spilled out into a suitably positioned receiving hopper 17 for drainage.

The hopper aforesaid, referring to Figure 3, is provided with a floor or floor panel filter 18 of any suitable construction and texture for the easy drainage away of the whey into a suitable discharge pipe 19 or the like below, such filter preferably being inclined to the horizontal as shewn to promote passage over it of the retained curds into the next part of the apparatus.

This latter consists of an open ended cylindrical chamber or drum 20, the peripheral surface of which is constructed as a filter indicated by hatching 21, preferably from end to end. The drum is mounted for rotation on a hollow shaft 22 set, if desired, at an inclination from the horizontal and borne at the ends in suitable journal bearings 23, 24, one of which, 23, lies outside the base of the hopper 17 so that one end of the shaft extends over the floor filter 18 and may carry worm or like surfaces as 25 operative thereover to keep it clear of the curds and feed them positively forwards towards the left into the drum 20.

The mounting of the drum 20 upon its shaft 22 is effected by means of one or more continuous worm or Archimedean screw blades 26 around the shaft so devised as, when the drum rotates in its intended sense, to advance the curd along the drum against the inside of its filter periphery 21 for ultimate discharge from the remote open end 27 of the drum, the curd being meanwhile subjected to a more or less intensive centrifuging effect on the filter surface according to the speed of rotation of the drum.

For the double purpose of removing the expressed whey and applying the required heating to the drum contents for drying the same and cooking it, the drum is encased from end to end in a more or less cylindrical vessel 28 having a drain connection 29 in its base conveniently linked externally with the discharge pipe 19 from the first or floor filter, and an external or other heating coil or the like as 30, the whole, though not so shown, being lagged or heat-insulated and under the thermostatic temperature control of any suitable electrical or other devices.

Preferably heat is also applied or circulated internally in any suitable way to the hollow drum shaft 22, e. g. through ends 22a and 22b, for more uniform and effective results in the drying of the curd.

The open discharge end 27 of the conveyor and filter drum spills into a fixed embracing receiver casing 31 which both mounts the second journal bearing 24 for the drum shaft and contains a vaned or like beater 32 rotatable at a high speed on a transverse horizontal axis in such a position that the discharged dried, more or less cooked, hardened and unworkable curd gravitates from 27 through it and is thoroughly macerated thereby before it can leave the base of the receiver. Below the beater a transversely movable plate or damper-like member 33 forms, when in the position shown, a gate, by retracting which the macerated product may be discharged intermittently and in measured quantities into an underlying cylinder 34 for compression therefrom into a mould of suitable form and capacity.

More particularly the cylinder comprises a piston or ram 35 reciprocable therein from a crank or the like of adjustable throw and speed of operation (indicated by the crank mechanism 36) so that the ram may discharge the cylinder of its contents into a mould 37 (one of a series suited to the rate of output) positioned as a temporary cover over the opposite end of the cylinder, and with the necessary degree of compacting or compression. Preferably provision is made for the interposition between the head of the piston or ram and the curd charge of a metal or other stout plate 38 which is entered into and left in the mould as hereinafter explained.

The mould 37 itself, of which there may be as many as desired and of a capacity and internal form or forms to suit requirements, is provided with a flanged bayonet action or other such rim 37a as may afford a readily made and unmade connection with the open cylinder end. Moreover holes in the sides of the mould may admit pins or the like 37b enterable radially into corresponding holes 38a in the edge of the retaining plate aforesaid to lock it there to maintain the curd in compression when the mould is removed for transferring to the curing room and as long thereafter as necessary for good results.

Adverting to the feeds to the vessels moving on the conveyor, each feed may be of substantially identical construction consisting essentially of an injector pump comprising a piston co-operating with inlet and outlet valves to discharge measured quantities of the milk or other liquid preferably as a spray from the respective nozzles 4, 5, or 6, giving sufficient agitation, intermittently in time with the passage of the vessels below. The timing is such as to start the charge from the beginning to the tray and end at the centre to enable all drips to stop short of the trailing end of the tray. The quantities measured out may be variable by adjustment of the piston stroke, so that the feeds may be interchangeable. They may conveniently also be driven as by crank or cam shaft means from a common driving shaft or counter-shaft suitably timed from the main shaft of the flexible conveyor, with preferably all other shafts to the various described actions including cutter mechanisms which operate in the vessels shortly before their contents are spilled out for drainage and other treatment.

It is to be understood that the invention is not limited either to apparatus details described above, or to any specific method of cheese making, i. e. involving particular agents, either the apparatus or the method being adaptable to the other.

Thus the so-called "starter" may be an acidifier or any suitable material for acid generation in the formation of cheese from milk, e. g. a suitable streptococcal or other bacterial culture suspended or not in a mild acid solution; the "coagulator" may be any suitable material such as a rennet solution or suspension for the stabilization by curdling and setting of the body of the milk. Also, calculated optimal temperatures embracing that (say 110° F.) of the milk as charged into the moving trays or like vessels, and the generally lesser temperatures as the latter advance, will be achieved or maintained by regulation of the rate of travel of the conveyor having regard to surrounding temperature and other conditions, by appropriate spacing of the various stages and if necessary by the aid of heating or heat insulation applied about the path of the vessels, particularly between the coagulation region and the cutter for correct acid development, curdling and coagulation. Depending upon the depth of the moving vessels which may best meet requirements, an elaboration of the cutter mechanisms such as is hereinafter described and illustrated may enable such to operate horizontally as well as vertically within the mass for cubing it to a satisfactory size.

Furthermore the positions of the supply tanks or the like may be interchangeable, one adjusting valve to be provided on each separate injector machine or device to calibrate the amount of fluid permitted in one injection per tray. The entire arrangement of tanks or the like and injectors is such that makes it possible for them to be compatible with whatever chemical and biological processes are to be used, e. g. permitting if desired the operation of several injectors upon each vessel or tray at one time.

The apparatus may, again, be provided with means for maintaining the filters in serviceable condition in a simple way, e. g. as by providing a by-pass current from discharge 19 for reverse flow of the whey at intervals through the sieve or filter meshes for clearing them.

It will further be understood that the entire processing of the curd from the first separation of whey therefrom is one of normal acid development and cooking, and is regulated first by the gradual reduction in the whey content of the curd through the rotary movement of the cylinder or drum and secondly by the thermostatic control enabling the keeping of satisfactory temperatures for the cooking of the curd. A certain amount of curd working will take place as the curd particles follow the centrifugal and axial movements imparted by the drum. The speed of the machine itself is the main factor in the actual cooking and making of the cheese whilst it undergoes the draining process. The system makes provision for the adequate treatment of every particle of the curd as it is presented. The necessity of working and stirring the curd for breaking up lumps and expressing whey according to the established processes is eliminated by the independent continuous working of this system, which, handling defined quantities of curd particles at every stage of the process assures uniformity of the cheese throughout such working, as every curd particle is subjected to the same mechanical procedure and under identical conditions. The press attachment with its adjustability of stroke adapts the apparatus for working a softer cheese or a harder cheese, although it could be removed and replaced if desired, for instance by a suitable shallow vat or the like which would accept the macerated curd for treatment in accordance with traditional methods of cheesemaking.

Reference is now made to the mechanisms shown in Figures 4 to 9.

Figure 4:
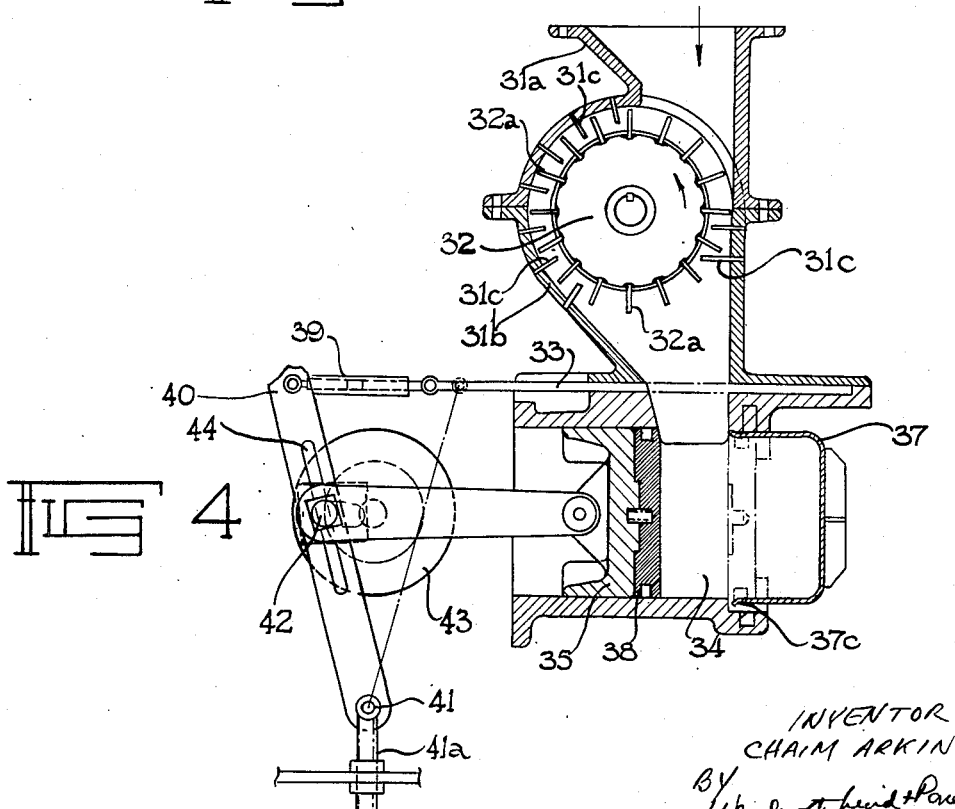
Figure 4 is a larger scale and more detailed sectional elevation of a preferred construction of the parts occurring at the left hand extremity of Figure 3.

The device shown in Figure 4 comprises an extension 31a from the receiver casing 31 and a lower section 31b forming therewith the casing of a beater rotor 32 with radial prongs 32a co-operative with fixed prongs 31c, the rotor revolving anticlockwise for intensive maceration of the curd which gravitates or is slung into the cylinder 34. The shutter or gate 38 derives its oscillative movements across the connection from beater to cylinder, through a link 39 from an arm or lever 40 pivoted at 41 below the crank pin 42 of the crank 43 which reciprocates the piston. The lever drives are imparted through a slot 44 for the known "quick-return" action, with adjustments afforded in the link 39 and the support 41a of the pivot 41.

In the construction here illustrated, whilst the method of connecting the mould 37 may be as already described with reference to Figure 3, the mouth of the mould may have a rim devised with a lip as at 37c, or local inturned portions, adapted for the closure plate 38 to be snapped into it behind the charge, as indicated by the broken-line showing.

In Figures 5 and 6 it will be seen that the vessels 2 have lips 50 and run on pairs of rollers 51 on a track 52. In advancing in the direction of the arrow the vessels in turn, through the upper parts of their rollers, cause cammed plates 52 to be raised from the broken-line lower position 51a to the full-line position. This movement is transmitted through rods 53, slidable in fixed guides 54, mounted on the aforesaid superstructure 10, and a connecting bridge 55 to a nozzled valve member 56, so that when the latter is raised as the vessel passes below it, a measured quantity of the medium from the reservoir 11, 12 or 13 above it, is discharged gravitationally. More particularly, the member 56 is of tubular form reciprocatable through a gland or seal and seating 57, having a mushroom head 58 resiliently loaded down upon the seating 57 by an encircling spring 59. When the cam plates 52 are raised as explained, holes as 56a through the member 56 are uncovered and flow occurs through them for discharge by the open nozzle end 4, 5, or 6.

Turning now to Figures 7 and 8, the bridge 60 carries transversely of the conveyor and above it a wire net or like reticulate member 61 and is reciprocated to the broken-line position 60a and back to the full-line position once for each vessel passing under it. In the position shown, the member 61 is about to be lowered into the front of the vessel 2, to be lifted out again just before the trailing end of the vessel reaches it, so that the curd is parted by the wires or the like forming the reticulations into square sections or rods from one end of the vessel to the other. This action is derived from side arms 62 which, pivoted at fixed points 63, are depressed by pins 64 carried by members 65 reciprocatable against return spring means 66 in response to the depression of cam plate members caused when rollers 51 ride over them. The cams 67 are guided at 68 and the necessary pressure for their depression is obtained by reaction rails 69 under which the rollers pass locally to the cam plates.

In the mechanism shown in Figure 7, which is for the parting of the curd into portions vertically, e. g. arranged to come into action subsequently to the parting of the curd by the mechanism of Figures 7 and 8 and accordingly to produce cube-like sections for delivery into the chute 17 already described, a bridge member 70 corresponding to member 60 carries a reticulate or wire net member 71 arranged horizontally and adapted to be lowered and raised as indicated by the vertical arrows into and out of the vessel 2, two or more times, as it travels towards the left. This action is derived from a lever and cam system generally similar to that shown in Figures 7 and 8, differing essentially in that the cam 72 is shaped with projections 73 and 74 which are successively depressed as each pair of rollers of each vessel passes thereover. Other parts corresponding to those in Figures 7 and 8 are similarly identified as in those figures.

What I claim is:

1. A continuous method for the manufacture of cheese by inoculation of milk with a starter, coagulation, separation of the whey from the curd and curing, which comprises inoculating milk fluid with a measured amount of starter, coagulating the fluid with a measured amount of coagulant, sub-dividing the coagulated mass to release and drain the whey from the curd, forcibly expressing further whey from the curd, partially drying the resultant curd product at a controlled elevated temperature, homogenizing the mass into uniform consistency and shaping the cheese mass into forms suitable for maturing.

2. A method as in claim 1 in which the starter and coagulant are incorporated in a milk fluid and are fed to the main stream of the milk fluid in small controlled amounts in order to control the composition of the coagulated curd in a predetermined timed cycle feeding process.

3. A method as in claim 2 in which milk fluid is added in a timed cycle feeding process to the drained curd in order to control the composition of the curd product prior to beating.

4. A method as claimed in claim 1 wherein the sub-divided coagulated curd is filtered and thereafter centrifuged in order to remove residual whey from the filtered curd.

5. A method as claimed in claim 4 wherein the centrifuged curd is added to the heated homogenized curd product before maturing and thereafter pressed into forms suitable for maturing.

6. A method as claimed in claim 5 wherein the blended product obtained in claim 5 is added to the heated product prior to maturing and molded into form suitable for maturing.

7. An apparatus for the continuous manufacture of cheese by coagulation of milk with a starter, coagulation, separation of the whey from the curd and curing, which comprises an endless flexible conveyor carrying externally attached containers for the milk product being processed, a motive means for advancing the conveyor, container means for delivering the milk fluid to the externally attached containers, a milk fluid reservoir, a starter measuring and feeding device overhanging the upper part of the conveyor from a starter supply reservoir, a coagulation measuring and feeding device overhanging the upper part of the conveyor and connected to a supply reservoir, the coagulation and starter supply reservoirs being arranged in adjustable position relative to the horizontal arrangement of the conveyor, a mechanical cutting means enterable downwardly into the externally attached processing containers for dissecting the coagulated curd, an open-ended cylindrical filter chamber, the peripheral surface of which is constructed as a filter from end to end, said chamber mounted for rotation and provided with a feeding screw means to advance the coagulated curd along the chamber against the inside of its filtering periphery and to discharge the centrifuged filtered curd from the open end of said chamber.

8. An apparatus as in claim 7 wherein the externally attached container is provided with tipping means in order to discharge its contents from the conveyor into a suitably positioned receiving hopper in order to drain the whey from the coagulated curd.

9. An apparatus as in claim 8 wherein the receiving hopper for the draining of the curd from the whey is provided with a filtering means and inclined with respect to the vertical in order to promote the separation of the whey from the curd.

10. An apparatus as in claim 7 wherein the chamber is provided with heating means to encase said chamber from end to end, said heating means operating to heat, dry and cook the coagulated curd passing through the chamber.

11. An apparatus as in claim 9 wherein the chamber is provided with heating means to encase said chamber from end to end, said heating means operating to heat, dry and cook the coagulated curd passing through the chamber.

12. An apparatus as in claim 7 which includes beater means operative on the whey-freed and cooked curd, and pressing means for compacting measured quantities of curd into molds for maturing.

CHAIM C. A. ARKIN.

References Cited in the file of this patent

UNITED STATES PATENTS

| Number | Name | Date |
|---|---|---|
| 1,323,869 | Kraft | Dec. 2, 1919 |
| 1,523,678 | Wheeler et al. | Jan. 20, 1925 |
| 1,708,099 | Kernen | Apr. 9, 1929 |
| 1,796,445 | Doering et al. | Mar. 17, 1931 |
| 2,160,159 | Lundstedt | May 30, 1939 |